(12) United States Patent
Kojima et al.

(10) Patent No.: US 8,490,604 B2
(45) Date of Patent: Jul. 23, 2013

(54) FUEL FEEDING DEVICE FOR GAS ENGINE

(75) Inventors: Hiroaki Kojima, Wako (JP); Masanori Fujinuma, Wako (JP); Haruo Tsusaka, Wako (JP); Tsukasa Ebisudani, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 1085 days.

(21) Appl. No.: 12/477,408

(22) Filed: Jun. 3, 2009

(65) Prior Publication Data

US 2009/0301443 A1 Dec. 10, 2009

(30) Foreign Application Priority Data

Jun. 4, 2008 (JP) ................................. 2008-147165
Jun. 4, 2008 (JP) ................................. 2008-147207

(51) Int. Cl.
*F02B 43/00* (2006.01)

(52) U.S. Cl.
USPC ............ 123/529; 123/511; 123/512; 123/527

(58) Field of Classification Search
USPC .................. 123/198 DB, 457, 511, 512, 513, 123/525, 527, 529, 543, 545, 575, 590
See application file for complete search history.

(56) References Cited

U.S. PATENT DOCUMENTS

| | | | | |
|---|---|---|---|---|
| 2,675,793 A * | 4/1954 | Ziege | ............................. | 123/525 |
| 2,933,076 A * | 4/1960 | Spencer | ......................... | 123/528 |
| 3,118,494 A * | 1/1964 | Ward et al. | .................... | 236/9 R |
| 3,860,170 A * | 1/1975 | Katchka | .......................... | 236/92 A |
| 4,141,330 A * | 2/1979 | Schlott | ........................... | 123/453 |
| 4,483,303 A * | 11/1984 | Ishikawa et al. | .............. | 123/527 |
| 4,497,339 A * | 2/1985 | Gruner et al. | ................. | 137/495 |
| 4,509,479 A * | 4/1985 | Rijkeboer | ..................... | 123/525 |
| 5,735,248 A * | 4/1998 | Matsuura et al. | ............. | 123/527 |
| 6,427,670 B2 | 8/2002 | Goto et al. | | |
| 7,451,747 B2 * | 11/2008 | Hayashi et al. | ............... | 123/557 |
| 2003/0106538 A1 | 6/2003 | Benson | | |

FOREIGN PATENT DOCUMENTS

| | | |
|---|---|---|
| EP | 1715400 A1 | 10/2006 |
| EP | 1895143 A1 | 3/2008 |
| JP | 54-64813 U | 5/1979 |
| JP | 63-041651 A | 2/1988 |
| JP | 6-066207 A | 3/1994 |
| JP | 06-213078 A | 8/1994 |
| JP | 08-210191 A | 8/1996 |
| JP | 11-311367 A | 11/1999 |
| JP | 2006-312901 A | 11/2006 |

OTHER PUBLICATIONS

European Search Report dated Jun. 20, 2011, issued in corresponding European Patent Application No. 09251485.0.
Chinese Office Action dated Dec. 6, 2010, issued in corresponding Chinese Patent Application No. 200910142645.8.
Japanese Office Action dated Nov. 29, 2011, issued in corresponding Japanese Patent Application No. 2008-147165.
European Office Action dated Feb. 1, 2012, issued in corresponding European Patent Application No. 09251485.0.
Korean Office Action dated Mar. 10, 2011, issued in correspodning Korean Patent Application No. 10-2009-0046560.
Japanese Office Action dated Apr. 3, 2012, issued in corresponding Japanese Patent Application No. 2008-147207.

* cited by examiner

*Primary Examiner* — Mahmoud Gimie
*Assistant Examiner* — David Hamaoui
(74) *Attorney, Agent, or Firm* — Westerman, Hattori, Daniels & Adrian, LLP (57) ABSTRACT

An engine fuel feeding device that is small-sized and easy to start. A cutoff valve is disposed upstream from a primary regulator provided to a fuel passage from a fuel feeding source to an engine. The cutoff valve is provided integrally with the primary regulator. When the gas engine is stopped, the fuel feeding passage is blocked in front of the primary regulator, gas fuel does not flow in the downstream direction that includes the primary regulator, and the ability of the gas engine to start is enhanced.

1 Claim, 10 Drawing Sheets

FIG. 4A
(1ST EMB.)

DURING NORMAL OPERATION

FIG.9B

WHEN STANDING AT LOW TEMPERATURE

FUEL FEEDING DEVICE FOR GAS ENGINE

FIELD OF THE INVENTION

The present invention relates to an improvement in a fuel feeding device for a gas engine.

BACKGROUND OF THE INVENTION

Japanese Patent Application Laid-Open Publication No. 2006-312901 discloses a conventional fuel feeding device for a gas engine. In this fuel feeding device, a cutoff valve for blocking the supply of fuel to the gas engine when the gas engine is stopped is provided between a primary regulator and a secondary regulator.

A small-sized cassette tank charged with butane gas is connected to an entrance of the fuel feeding device described above. An exit of the fuel feeding device is connected to a fuel nozzle that is attached to a mixer which in turn is connected to an air intake port of the gas engine.

The fuel feeding device is provided with a vaporizer, a primary regulator, a cutoff valve, and a secondary regulator that are provided in sequence in the direction from the fuel entrance to the fuel exit. The crankcase, air intake port, or other negative-pressure portion of the gas engine is connected to the cutoff valve.

Negative pressure does not occur in the negative-pressure portions when the gas engine is stopped, and the cutoff valve is therefore closed, but when a piston of the gas engine moves and a negative pressure occurs in a negative-pressure portion of the gas engine, the cutoff valve is opened by this negative pressure, and the fuel in the small-sized tank flows to a fuel feeding passage that is past the vaporizer.

FIGS. 10A through 10D hereof show an operation of the conventional fuel feeding device for a gas engine described above, the vaporizer not being shown in the drawings.

Figure 10A:
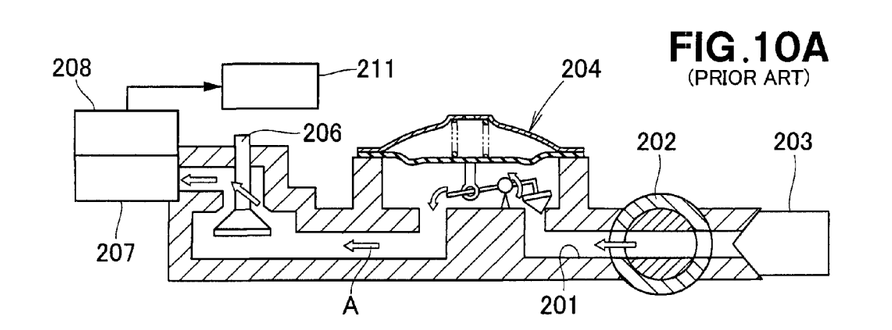
FIGS. 10A through 10D are sectional views showing an operation state of a conventional fuel feeding device.

In FIG. 10A, when a manual stopcock 202 provided to a fuel feeding passage 201 is opened, the fuel passes from a fuel tank 203 to the gas engine 211 through a primary regulator 204, a cutoff valve 206, a secondary regulator 207, and a mixer 208, as indicated by the arrow A, and the gas engine 211 becomes operative.

Figure 10B:
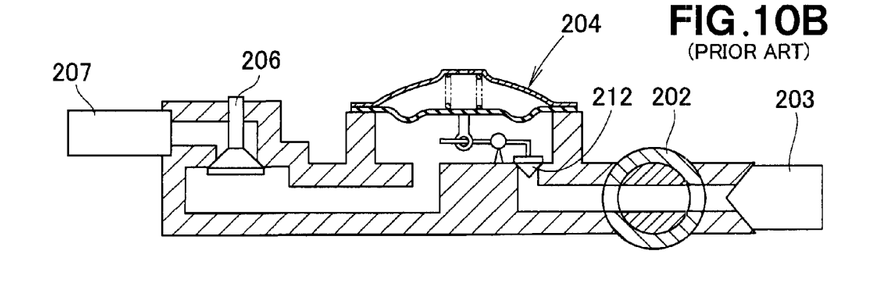

FIG. 10B shows a state in which the gas engine is stopped. A vacuum modulator 212 of the primary regulator 204 is closed, and the cutoff valve 206 is also closed. The manual stopcock 202 remains open at this time.

Figure 10C:
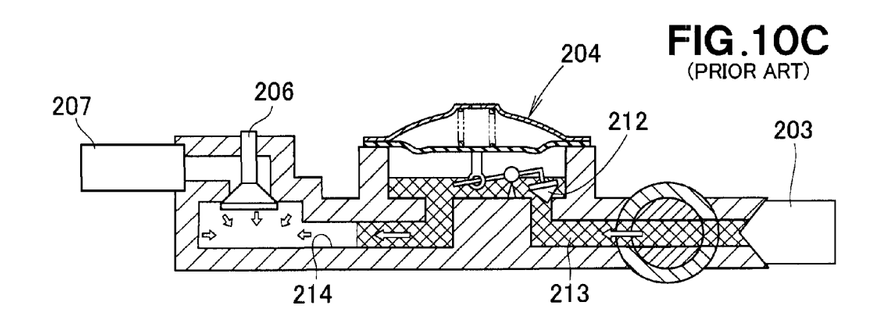

In FIG. 10C, when the outside air temperature decreases during the night, for example, and the pressure on the downstream side decreases below that of the vacuum modulator 212 of the primary regulator 204, the vacuum modulator 212 opens, and liquefied gas fuel 213 flows out from the fuel tank 203. When the outside air temperature is 0° C. or lower, for example, the liquefied gas fuel 213 is in liquid form, and penetrates into the primary regulator 204 and the fuel passage 214 between the primary regulator 204 and the cutoff valve 206.

Figure 10D:
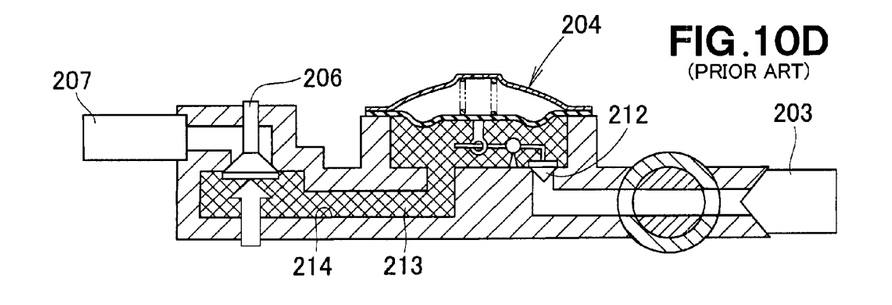

In FIG. 10D, when the outside air temperature changes in the afternoon, for example, from the state shown in FIG. 10C so as to exceed 0° C., the liquefied gas fuel 213 changes to a gas, and the pressure inside the primary regulator 204 and the fuel passage 214 therefore increases.

As a result, a high pressure acts on the vacuum modulator 212 or the cutoff valve 206, making it difficult for these components to open, and the gas engine becomes difficult to start. Even when the vacuum modulator 212 or the cutoff valve 206 does open, the mixture fed to the gas engine is highly concentrated, and it is thus difficult for the ability of the gas engine to start to improve.

Multi-purpose engines that use gas fuel are often used in a manner that involves frequent movement to perform work, and therefore must be small and lightweight. The fuel feeding device also needs to be small, and there is a particular need for reduced cost in small-sized multi-purpose engines.

SUMMARY OF THE INVENTION

An object of the present invention is to provide a gas engine fuel feeding device that is small-sized and low cost, and that enhances the starting ability of the engine.

In one aspect of the present invention, there is provided a gas engine fuel feeding device for vaporizing fuel fed from a fuel feeding source and feeding the gas fuel to a gas engine via a fuel feeding passage, the engine fuel feeding device comprising a primary regulator for reducing the pressure of the gas fuel, the primary regulator being provided partway in the fuel feeding device; and a cutoff valve for blocking the gas fuel when the gas engine is stopped, the cutoff valve being provided integrally with the primary regulator and disposed upstream in the flow of fuel with respect to the primary regulator.

When the gas engine is stopped, the flow of fuel that has flowed out from the fuel feeding source is blocked by the cutoff valve provided upstream in the flow of fuel with respect to the primary regulator, and the fuel does not flow past the primary regulator. Consequently, the present invention prevents the drawbacks of the prior art, in which the fuel accumulated downstream from the primary regulator liquefies at 0° C. or lower, for example, the pressure inside the fuel feeding passage decreases, the cutoff valve or the vacuum modulator of the primary regulator become difficult to open, and the mixture fed to the gas engine is highly concentrated even when the cutoff valve or the vacuum modulator is open, and the gas engine becomes difficult to start. In other words, when the gas engine is stopped, the fuel feeding passage is blocked in front of the primary regulator, fuel can be prevented from flowing downstream from the primary regulator, and the ability of the gas engine to start can be enhanced.

Furthermore, the cutoff valve is provided integrally with the primary regulator, and the number of ducts for connecting between the cutoff valve and the primary regulator, or the number of steps for connecting ducts is thereby reduced, the number of components and assembly steps can be reduced, compactness and small size of the fuel feeding device can be anticipated, and cost can be reduced.

In another aspect of the present invention, there is provided a gas engine fuel feeding device, the gas engine fuel feeding device comprising a fuel feeding source; a vaporizer for vaporizing the fuel fed from the fuel feeding source; a primary regulator for reducing the pressure of the gas fuel; a secondary regulator for further reducing the pressure of the gas fuel to a pressure near atmospheric pressure, the pressure of the gas fuel having been reduced by the primary regulator; a mixer for mixing the secondary pressure-reduced gas fuel with air; and a cutoff valve for blocking the flow of fuel when the gas engine is stopped, the cutoff valve being provided to a fuel feeding passage through which the fuel vaporized by the vaporizer is fed to a gas engine; wherein the cutoff valve is provided upstream in the flow of fuel with respect to the primary regulator, and is a temperature-sensing valve for sensing the ambient temperature and closing when the ambient temperature is lower than a set temperature.

Since the cutoff valve is a temperature-sensing valve, when the gas engine is stopped, the fuel feeding passage is blocked in front of the primary regulator, fuel can be prevented from flowing downstream from the primary regulator, and the ability of the gas engine to start can be enhanced.

Preferably, the primary regulator has a fuel passage entrance, and a diaphragm lever that is provided integrally with a vacuum modulator for opening and closing the fuel passage entrance, and the primary regulator is provided with a temperature-detecting operating device having an actuating rod for detecting the ambient temperature and actuating the diaphragm lever.

When the gas engine is stopped, and the ambient temperature of the primary regulator reaches a set temperature that is set higher than the temperature at which the fuel liquefies, the actuating rod provided to the temperature detecting operation device actuates the diaphragm lever, and the vacuum modulator of the primary regulator is fixed in a closed state. As a result, the liquid fuel does not flow to the fuel passage downstream from the primary regulator even when the ambient temperature of the primary regulator decreases to the temperature at which the fuel liquefies. Consequently, the present invention prevents the engine from becoming difficult to start due to liquid fuel having penetrated past the primary regulator when the engine is stopped, as in the prior art. The ability of the gas engine to start is thus enhanced.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
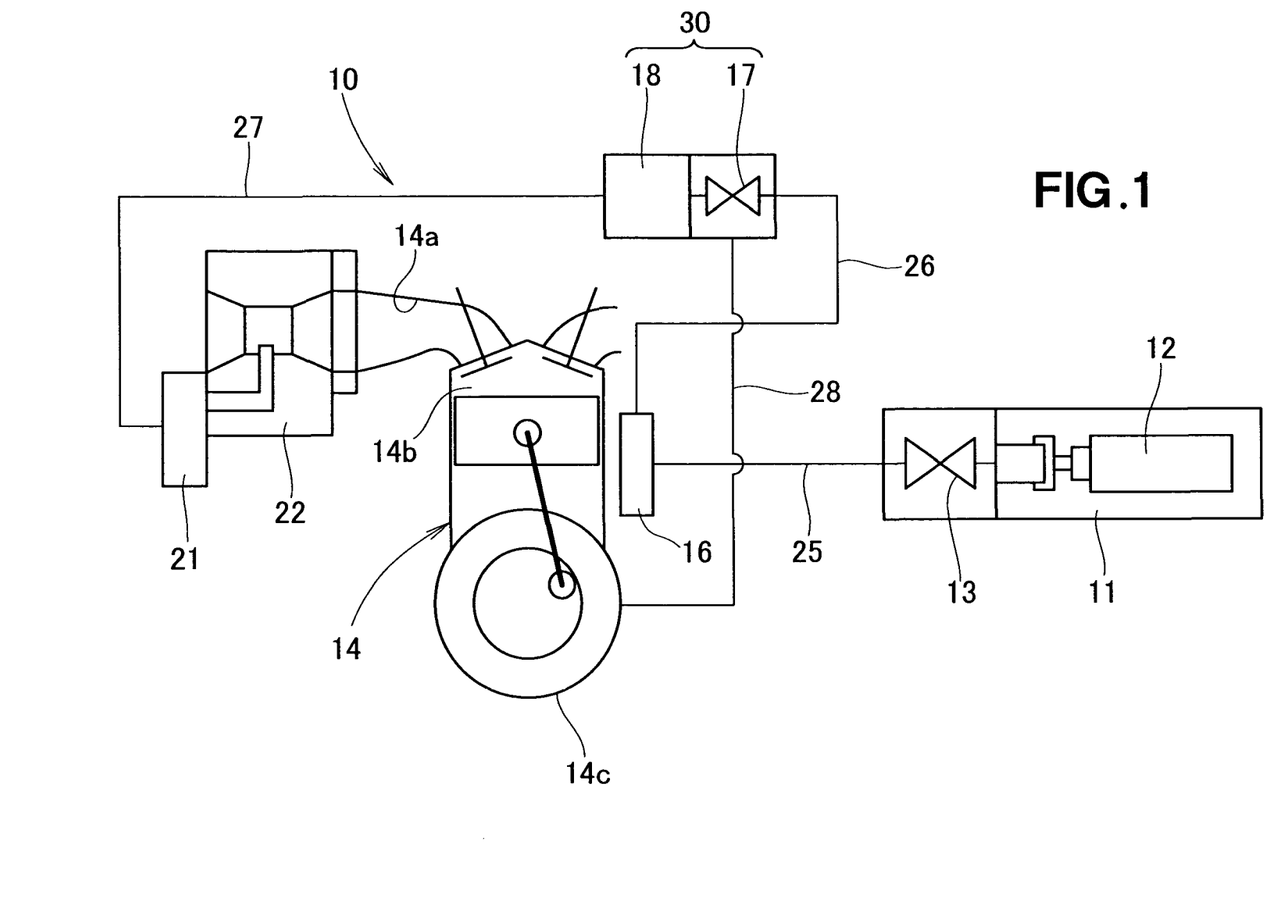
FIG. 1 is a diagrammatical view showing a gas engine fuel feeding device according to a first embodiment of the present invention.

As shown in FIG. 1, the fuel feeding device 10 according to a first embodiment is composed of a small-sized gas tank (fuel feeding source) 12 that is mounted in a tank case 11 and charged with liquefied butane, for example, as a liquefied gas fuel; a manual stopcock 13 for switching between discharge and blockage of the liquefied gas fuel from the small-sized gas tank 12, the manual stopcock 13 being provided integrally with the tank case 11; a vaporizer 16 for utilizing heat generated by a gas engine 14 to vaporize the liquefied gas fuel (liquefied butane) into gas fuel (butane gas); a cutoff valve 17 for allowing the gas fuel vaporized by the vaporizer 16 to flow during operation of the gas engine, and blocking the gas fuel when the gas engine is stopped; a primary regulator 18 for reducing the pressure of the gas fuel to a predetermined pressure, the primary regulator 18 being structurally integrated with the cutoff valve 17; and a secondary regulator 21 for further reducing the pressure of the gas fuel to a pressure near atmospheric pressure, the pressure of the gas fuel having been reduced by the primary regulator 18.

The gas fuel depressurized by the secondary regulator 21 is fed to a mixer 22 and mixed with air to form a mixture, and the mixture is taken into a combustion chamber 14b via an air intake port 14a of the gas engine 14.

The reference numerals 25, 26, and 27 refer to fuel ducts. The reference numeral 28 refers to a negative-pressure duct for connecting the cutoff valve 17 and a crankcase 14c of the gas engine 14. The cutoff valve 17 is opened by negative pressure generated inside the crankcase 14c during operation of the gas engine, and closes when the gas engine is stopped, since negative pressure then does not occur in the crankcase 14c.

The cutoff valve 17 and the primary regulator 18 constitute a cutoff-valve-integrated regulator 30.

Figure 2:
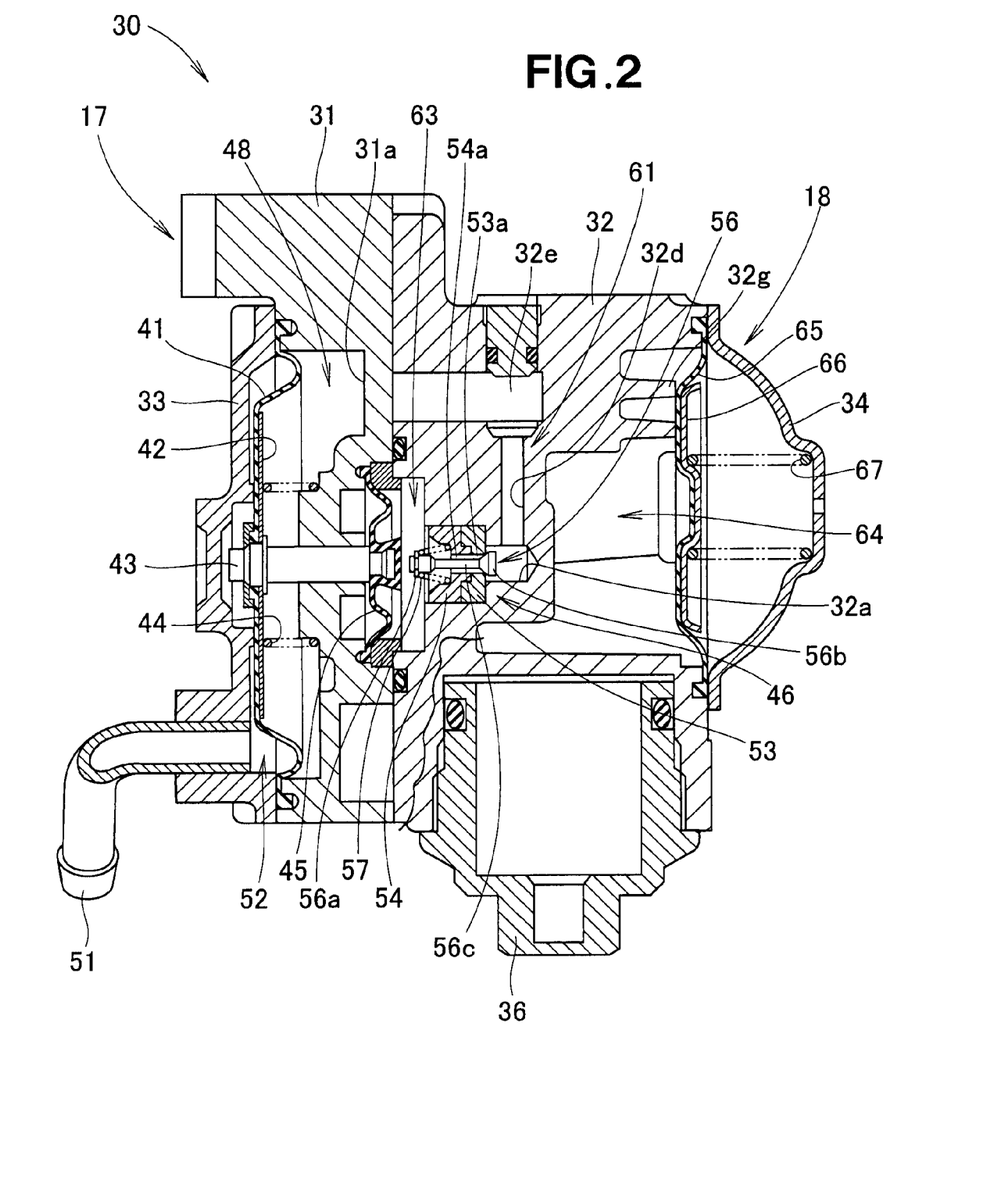
FIG. 2 is a sectional view showing details of a cutoff-valve-integrated regulator of FIG. 1.

As shown in FIG. 2, the cutoff-valve-integrated regulator 30 is provided with first and second block members 31, 32 adjacent to each other; a cover member 33 for blocking a side opening of the first block member 31; a cap member 34 for blocking a side opening of the second block member 32; and a cup member 36 attached to the lower part of the second block member 32.

The cutoff valve 17 is composed of a first diaphragm 41 fixed between the first block member 31 and the cover member 33; a support plate 42 for supporting an inner surface of the first diaphragm 41; a rod 43 attached to the center of the support plate 42; a coil spring 44 for pushing the first diaphragm 41 and the support plate 42 against the cover member 33; a second diaphragm 45 that is attached to the distal end of the rod 43 movably inserted through the first block member 31; and a cutoff valve main body 46 that is provided to the second block member 32 so as to face the distal end of the rod 43.

A negative-pressure chamber 48 is formed by the first diaphragm 41 and a first concave part 31a that is formed in the first block member 31. The negative-pressure chamber 48 is communicated with the crankcase 14c (see FIG. 1) of the gas engine via a negative-pressure duct 28 (see FIG. 1). The reference numeral 51 refers to an atmosphere communicating duct that is attached to the cover member 33 in order to open an atmosphere chamber 52 between the cover member 33 and the first diaphragm 41 to the atmosphere.

The cutoff valve main body 46 is composed of a valve seat 53 that is inserted into a lower transverse passage 32a provided to the second block member 32; a valve seat support member 54 for supporting the valve seat 53; a valve body 56 provided in through-holes 53a, 54a that are formed in the valve seat 53 and valve seat support member 54, respectively; and a spring 57 provided between the valve seat support member 54 and one end of the valve body 56 so as to urge the valve body 56 in the closing direction.

The valve body 56 is composed of a spring support part 56a provided to one end of the valve body 56 to attach the spring 57; a valve body head part 56b provided to the other end of the valve body 56; and a connecting rod 56c for connecting the spring support part 56a and the valve body head part 56b to each other.

The valve body head part 56b is a portion pushed against the valve seat 53 by the elastic force of the spring 57, and in FIG. 2, a fuel passage 61 is closed by the valve body head part 56b; i.e., the cutoff valve 17 is closed.

The fuel passage 61 has a central chamber 63 communicated with the vaporizer 16 (see FIG. 1) and formed by the meeting surfaces of the block members 31, 32; the through-holes 53a, 54a; the lower transverse passage 32a in which a portion of the valve body head part 56b is accommodated; a longitudinal passage 32d, one end of which is connected to the lower transverse passage 32a; and an upper transverse passage 32e that is communicated with the other end of the longitudinal passage 32d. The upper transverse passage 32e is communicated via a passage not shown in the drawing with a depressurization chamber 64 provided to the primary regulator 18.

The primary regulator 18 is provided with a third diaphragm 65 fixed between the second block member 32 and the cap member 34; a pressing plate 66 provided on the external surface of the third diaphragm 65; a spring 67 for pushing the third diaphragm 65 against stopper part 32g via the pressing plate 66, the stopper part 32g being formed in the second block member 32; and the cup member 36.

The cup member 36 stores liquid tar that forms in the flow of gas fuel when the gas fuel passes through the depressurization chamber 64.

As described above, since the cutoff valve 17 and the primary regulator 18 are structurally integrated with each other, there is no need for a duct for connecting the cutoff valve 17 and the primary regulator 18, the number of components can be reduced, and the size of the cutoff-valve-integrated regulator 30 can be reduced. Furthermore, there is no need for steps for connecting the ducts, and the reduction in the number of components also reduces cost.

The operation of the cutoff valve 17 described above will next be described.

Figure 3:
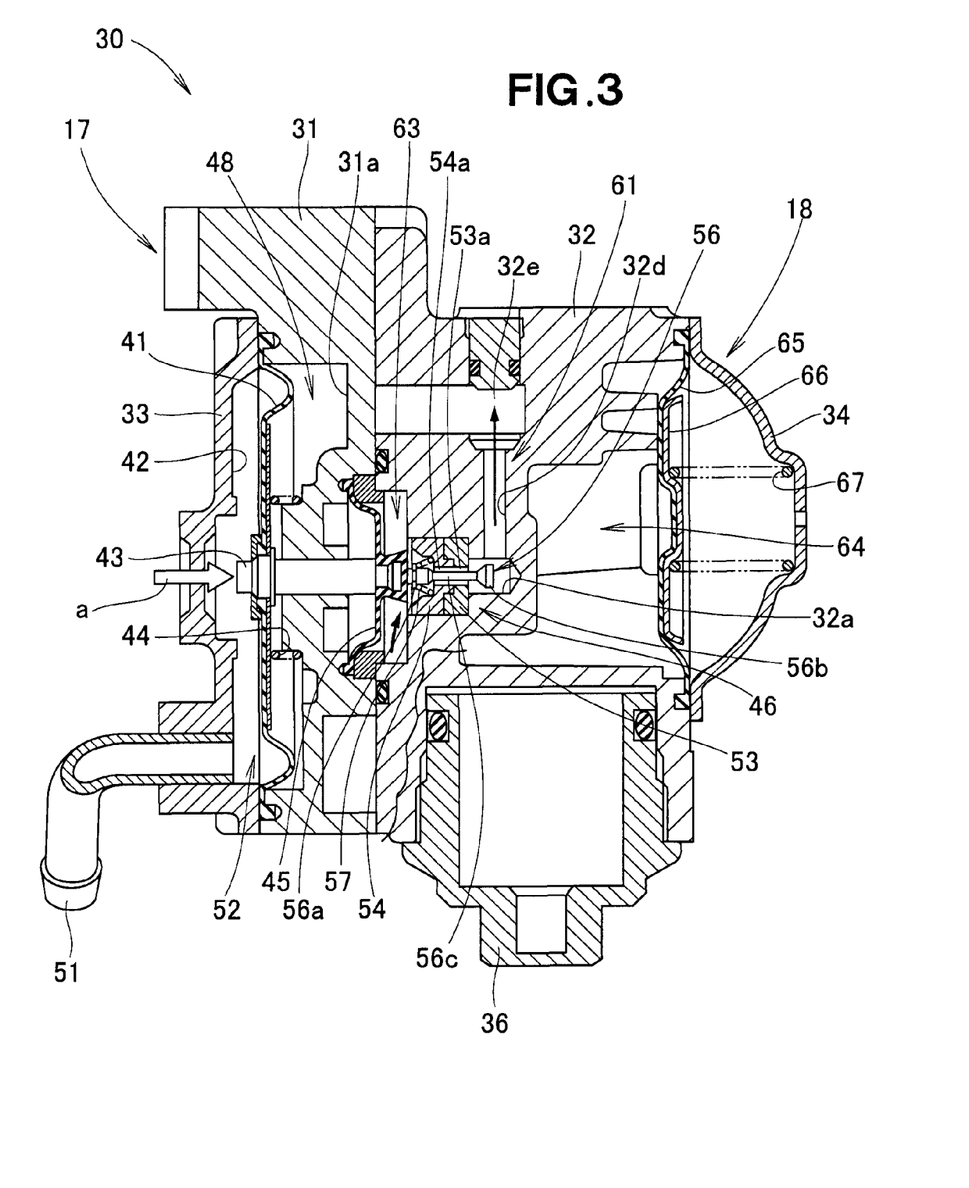
FIG. 3 is a sectional view illustrating an operation of the cutoff valve of FIG. 2.

As shown in FIG. 3, when the gas engine is started and the pressure of the negative-pressure chamber 48 of the cutoff valve 17 decreases, the first diaphragm 41 flexes and the first diaphragm 41 and support plate 42 move to the right in the drawing, and the rod 43 therefore also moves to the right in the drawing, as indicated by the arrow a. As a result, since the distal end of the rod 43 pushes one end of the valve body 56 via the second diaphragm 45, the valve body 56 also moves to the right in the drawing against the elastic force of the spring 57, the valve body head part 56b of the valve body 56 moves away from the valve seat 53, the fuel passage 61 opens, and the cutoff valve 17 opens.

The gas fuel that has flowed from the vaporizer 16 (see FIG. 1) into the fuel passage 61, i.e., the central chamber 63, reaches the depressurization chamber 64 of the primary regulator 18 through the through-holes 53a, 54a, the lower transverse passage 32a, the longitudinal passage 32d, the upper transverse passage 32e and a passage not shown in the drawing.

Figure 4A:
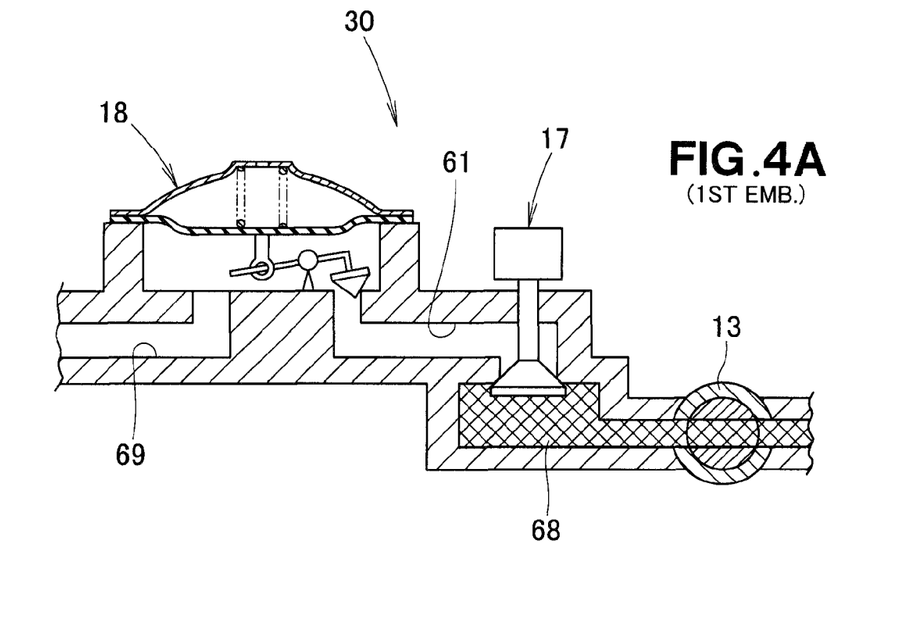
FIGS. 4A and 4B are sectional views showing a comparison of the cutoff valve according to the first embodiment, and a conventional cutoff valve.
Figure 4B:
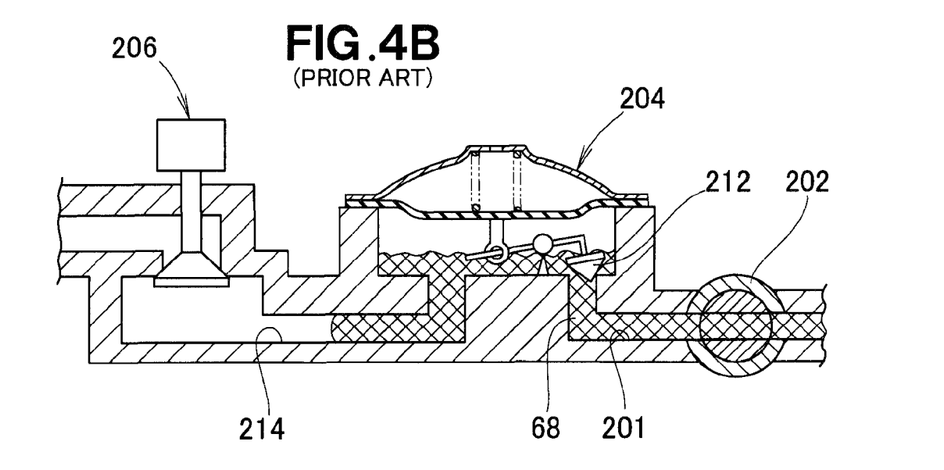

FIG. 4A shows the positioning of the cutoff valve 17 according to the first embodiment, and FIG. 4B shows the positioning of the cutoff valve 206 according to the prior art.

In FIG. 4A, when the cutoff valve 17 is provided upstream from the primary regulator 18, since the cutoff valve 17 is closed when the gas engine is stopped, the fuel passage 61 is blocked on the upstream side of the primary regulator 18, and liquefied gas fuel 68 does not penetrate into the primary regulator 18 even when the pressure inside the fuel passage 69 downstream from the primary regulator 18 is reduced.

As shown in FIG. 4B, when the cutoff valve 206 is provided downstream from the primary regulator 204, when the outside air temperature decreases at night or at another time, and the pressure decreases downstream from the vacuum modulator 212 of the primary regulator 204, the vacuum modulator 212 then opens, and the liquefied gas fuel 68 flows out from the small-sized tank. Once the outside air temperature decreases to 0° C. or below, for example, the liquefied gas fuel 68 is liquefied, and the fuel accumulates inside the primary regulator 204 and the fuel passage 214. As a result, the gas engine becomes difficult to start, as described with reference to FIG. 10D.

In the fuel feeding device according to the first embodiment as described using FIGS. 1 and 2, liquefied gas fuel fed from the small-sized gas tank 12 as a fuel feeding source is vaporized by the vaporizer 16, and this gas fuel is depressurized by the primary regulator 18. The pressure is further reduced to near atmospheric pressure by the secondary regulator 21. The cutoff valve 17 for blocking the flow of liquefied gas fuel when the gas engine 14 is stopped is provided to the fuel feeding passage in which the gas fuel and air are mixed together by the mixer 22 and fed to the gas engine 14. Since the cutoff valve 17 is provided upstream in the flow of liquefied gas fuel with respect to the primary regulator 18, and is provided integrally with the primary regulator 18, the fuel feeding passage is blocked in front of the primary regulator 18 when the gas engine is stopped, the fuel does not flow further downstream than the primary regulator 18, and the ability of the gas engine to start 14 can be enhanced.

The cutoff valve 17 is thus provided integrally with the primary regulator 18, and, as a result, there is no need for a duct for connecting between the cutoff valve 17 and the primary regulator 18, or for assembly steps for connecting the ducts, and the number of components and assembly steps can be reduced. The size of the cutoff-valve-integrated regulator 30 that constitutes the fuel feeding device 10 can be reduced, and cost can also be reduced.

Figure 5:
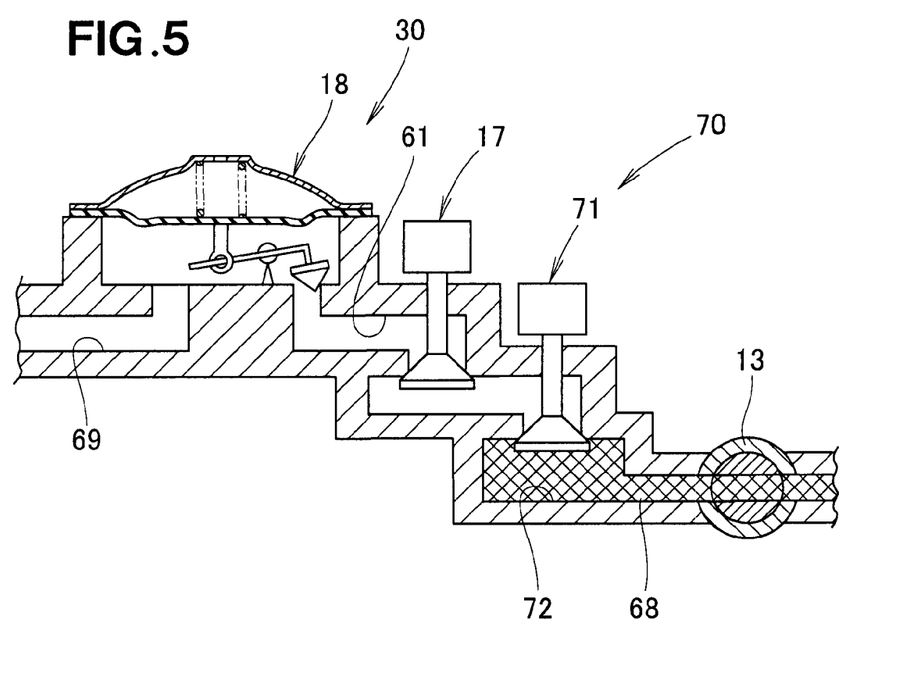
FIG. 5 is a sectional view showing a fuel feeding device according to a second embodiment of the present invention.

FIG. 5 shows the fuel feeding device according to a second embodiment. The same reference symbols are used to refer to components that are the same as those of the first embodiment shown in FIG. 1, and no detailed description thereof will be given.

In the fuel feeding device 70 according to the second embodiment shown in FIG. 5, a temperature-sensing valve 71, the cutoff valve 17, and the primary regulator 18 are provided in sequence on the downstream side of the manual stopcock 13.

The temperature-sensing valve 71 is a valve for opening and closing a fuel passage 72 when the outside air temperature reaches a set temperature, the lower limit of the set temperature T is 0° C., for example, at which the butane that is a component of the liquefied gas fuel becomes a liquid, and the upper limit of the set temperature T is 10° C., for example, which is the temperature at which it is possible for the gas engine to start being used (0° C.<T<10° C.).

In a state in which the gas engine is stopped, and the manual stopcock 13 is open, when the outside air temperature falls below the set temperature T, for example, the temperature-sensing valve 71 closes, and the liquefied gas fuel 68 is prevented from flowing further downstream than the temperature-sensing valve 71.

When the outside air temperature is higher than the set temperature T, the temperature-sensing valve 71 opens, and the liquefied gas fuel 68 is fed to the primary regulator 18 when the cutoff valve 17 is also open.

A wax, bimetal, or shape-memory alloy is suitable as the operational medium for detecting the temperature and causing the temperature-sensing valve 71 to open and close, and a solenoid valve that operates based on a signal from a temperature sensor may also be used in a gas engine in which an electric device can be used.

The cutoff valve is provided upstream in the flow of liquefied gas fuel with respect to the primary regulator 18, and is the temperature-sensing valve 71 for sensing the ambient temperature and closing when the ambient temperature is lower than the set temperature T. Therefore, when the gas engine is stopped, the fuel feeding passage is blocked in front of the primary regulator 18 by the temperature-sensing valve 71, fuel is prevented from flowing past the primary regulator 18, and the ability of the gas engine to start 14 (see FIG. 1) is enhanced.

As shown in FIG. 5, the temperature-sensing valve 71 is provided on the upstream side of the cutoff valve 17 in the second embodiment, but this configuration is not limiting, and the temperature-sensing valve 71 may also be provided downstream from the cutoff valve 17 and upstream from the primary regulator 18.

The fuel feeding device 80 according to a third embodiment will next be described. The same reference symbols are used to refer to components that are the same as those of the first embodiment.

Figure 6:
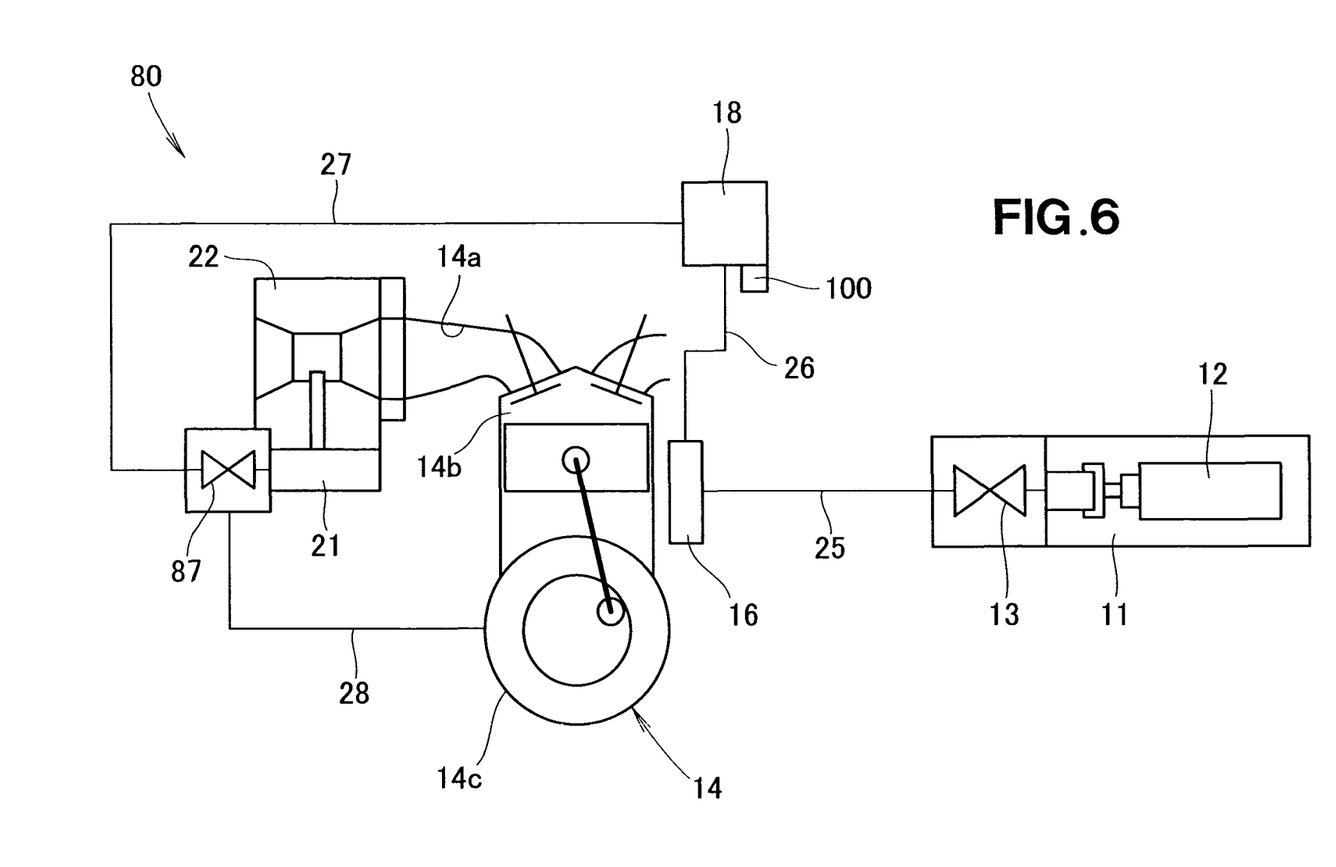
FIG. 6 is a diagrammatical view showing a gas engine fuel feeding device according to a third embodiment of the present invention.

The fuel feeding device 80 according to the third embodiment shown in FIG. 6 is composed of a small-sized gas tank 12 that is mounted in a tank case 11 and charged with liquefied butane, for example, as a liquefied gas fuel; a manual stopcock 13 for switching between discharge and blockage of the fuel from the small-sized gas tank 12, the manual stopcock 13 being provided integrally with the tank case 11; a vaporizer 16 for utilizing heat generated by a gas engine 14 to facilitate vaporization of the liquefied gas fuel (liquefied butane) into gas fuel (butane gas); a primary regulator 18 for reducing the pressure of the gas fuel to a predetermined pressure, the gas fuel having been vaporized by the vaporizer 16; a temperature-detecting operating device 100 attached to the primary regulator 18 in order to forcibly close a vacuum modulator provided to the primary regulator 18 according to the outside air temperature; a cutoff valve 87 for blocking the gas fuel generated by the vaporizer 16 when the gas engine is stopped, and allowing the gas fuel to flow when the gas engine is operating; and a secondary regulator 21 for further reducing the pressure of the gas fuel to a pressure near atmospheric pressure, the pressure of the gas fuel having been reduced by the primary regulator 18.

The gas fuel depressurized by the secondary regulator 21 is fed to a mixer 22 and mixed with air to form a mixture, and the mixture is taken into a combustion chamber 14b via an air intake port 14a of the gas engine 14.

The reference numerals 25 through 27 refer to fuel ducts. The reference numeral 28 refers to a negative-pressure duct for connecting the cutoff valve 87 and a crankcase 14c of the gas engine 14; the cutoff valve 87 is opened by negative pressure generated inside the crankcase 14c during operation of the gas engine, and the cutoff valve 87 closes when the gas engine is stopped.

Figure 7:
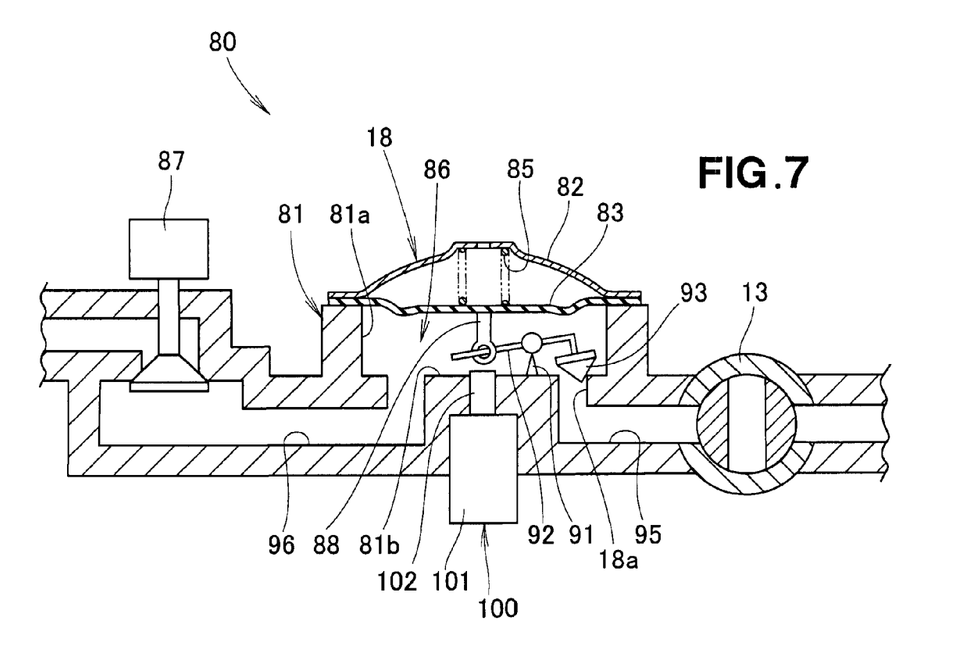
FIG. 7 is a sectional view showing a primary regulator of FIG. 6.

FIG. 7 is a view omitting the vaporizer 16 (FIG. 6) provided between the manual stopcock 13 and the primary regulator 18.

The primary regulator 18 is composed of a housing 81; a cap member 82 for blocking an open part of a concave part 81a formed in the housing 81; a diaphragm 83 fixed between the housing 81 and the cap member 82; a plate (not shown) positioned adjacent to an external surface of the diaphragm 83 in order to support the diaphragm 83; a spring 85 provided between the plate and the cap member 82 in order to push the diaphragm 83 and the plate toward a depressurization chamber 86 formed by blockage of the concave part 81a by the diaphragm 83; a diaphragm rod 88 for protruding into the depressurization chamber 86, the diaphragm rod 88 being attached to the plate; a diaphragm lever 92 that is swingably attached to a support point 91 provided to a bottom part 81b of the concave part 81a, one end of the diaphragm lever 92 being connected to the diaphragm rod 88; and a vacuum modulator 93 attached to the other end of the diaphragm lever 92.

The reference numeral 95 refers to a fuel passage from the manual stopcock 13 to the primary regulator 18, and the reference numeral 96 refers to a fuel passage from the primary regulator 18 to the cutoff valve 87.

The vacuum modulator 93 opens and closes an entrance 18a of the fuel passage in the primary regulator 18 that is communicated with a fuel passage 95.

The temperature-detecting operating device 100 is composed of an operating device main body 101 and an actuating rod 102 that projects and retracts with respect to the operating device main body 101, and the operating device main body 101 is attached to the housing 81, i.e., the bottom part 81b of the concave part 81a, of the primary regulator 18.

Figure 8A:
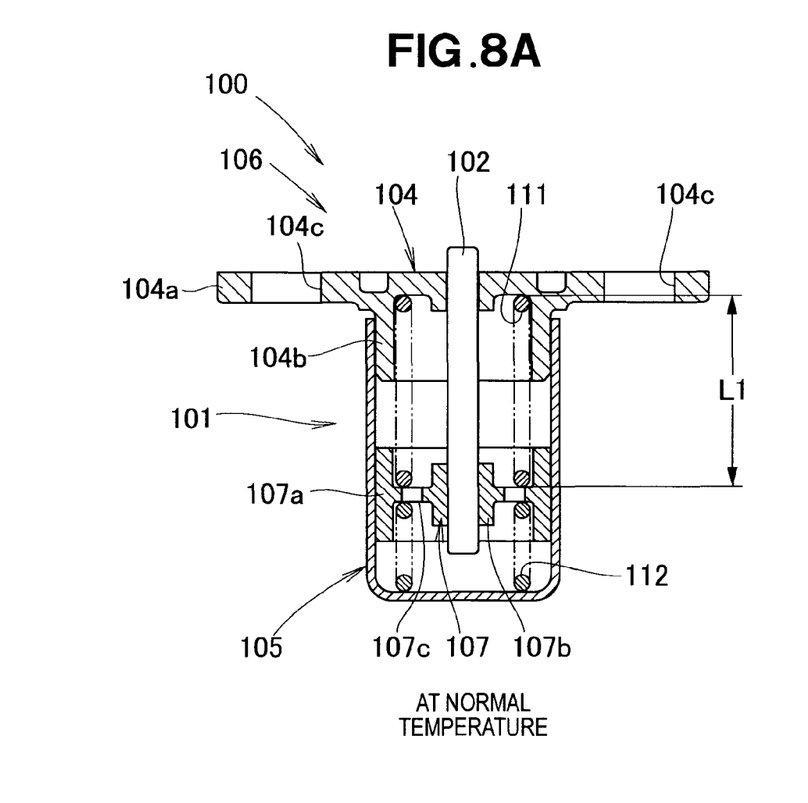
FIGS. 8A and 8B are sectional views showing an operation state during a normal temperature operation and a low temperature operation of a temperature-detecting operating device of FIG. 7.
Figure 8B:
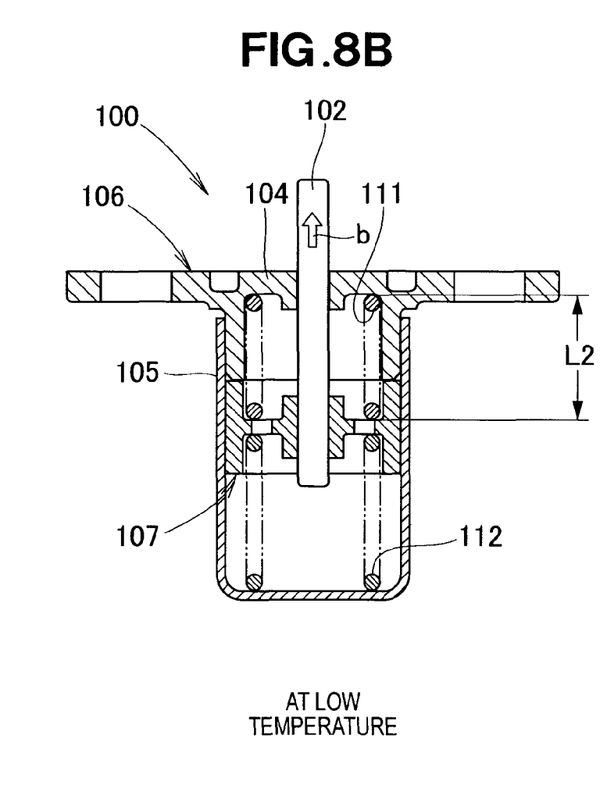

FIGS. 8A and 8B show the operation of the temperature-detecting operating device 100 when at normal temperature and at low temperature.

As shown in FIG. 8A, the operating device main body 101 is composed of a case 106 that is made up of a first case 104 attached to the housing 81 (FIG. 7) of the primary regulator 18 (FIG. 7), and a bottomed cylindrical second case 105 attached to the first case 104; a slide member 107 movably inserted into the second case 105; a first compression coil spring 111 provided between the first case 104 and the slide member 107; and a second compression coil spring 112 provided between the second case 105 and the slide member 107. The actuating rod 102 is attached to the slide member 107.

The first case 104 is composed of a flange 104a for attaching to the housing 81 of the primary regulator 18 (FIG. 7), and a cylinder part 104b that is integrated with the flange 104a and that extends downward integrally from the flange 104a. The flange 104a has bolt insertion holes 104c, 104c through which attachment bolts are passed. The cylinder part 104b is fitted in the second case 105.

The slide member 107 is composed of a cylindrical part 107a that slides against the internal surface of the slide member 107; a boss part 107b for fitting on the actuating rod 102; and a connecting part 107c for connecting each of the actuating rod 102 and the boss part 107b.

The first compression coil spring 111 is composed of a shape-memory alloy material, and the second compression coil spring 112 is made of steel. The reference symbol L1 in the drawing indicates the attachment length of the first compression coil spring 111.

FIG. 8B shows the temperature-detecting operating device 100 when at low temperature.

When the ambient temperature is lower than normal temperature, the first compression coil spring 111 shortens to a length memorized at a predetermined temperature, and has the length L2, which is shorter than the attachment length L1. This reduction in length is accompanied by extension of the second compression coil spring 112 that had been compressed, and the actuating rod 102 moves together with the slide member 107 as indicated by the arrow b and protrudes significantly from the case 106.

The first compression coil spring 111 shortens to a predetermined length when the ambient temperature falls below a set temperature. The lower limit of the set temperature T is 0° C., for example, at which the butane that is a component of the liquefied gas fuel becomes a liquid, and the upper limit of the set temperature T is 10° C., for example, which is the temperature at which it is possible for the gas engine to start being used (0° C.<T<10° C.).

The operation of the fuel feeding device 80 according to the third embodiment described above will be described based on FIGS. 9A and 9B.

Figure 9A:
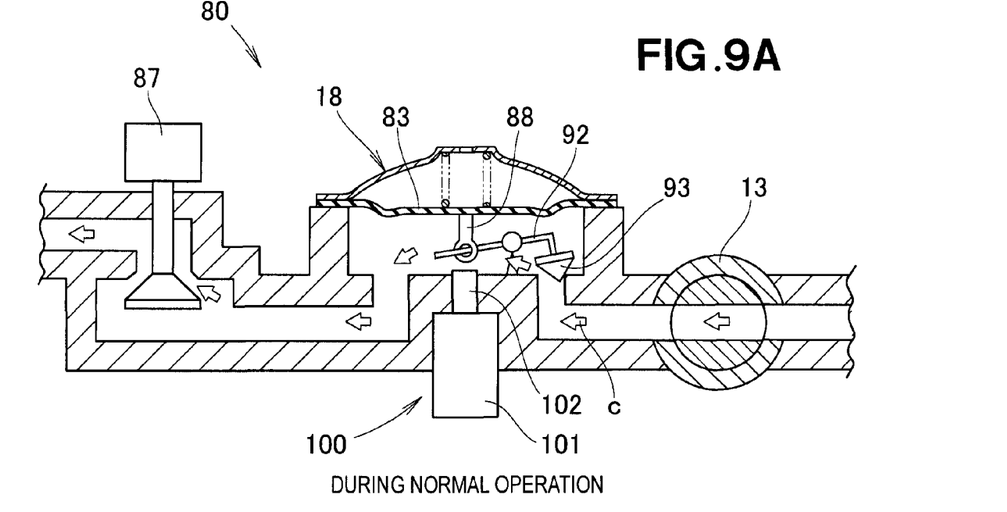
FIGS. 9A and 9B are sectional views illustrating an operation state during normal operation and low-temperature standing of the primary regulator shown in FIG. 7.

FIG. 9A shows the fuel feeding device 80 during normal operation of the engine.

The ambient temperature of the temperature-detecting operating device 100 is higher than the set temperature, the actuating rod 102 of the temperature-detecting operating device 100 is retracted into the operating device main body 101 and separated from the diaphragm rod 88 of the primary regulator 18, and the vacuum modulator 93 is open.

The liquefied gas fuel flows from the small-sized gas tank to the gas engine through the manual stopcock 13, the primary regulator 18, and the cutoff valve 87, as indicated by the arrow c.

Figure 9B:
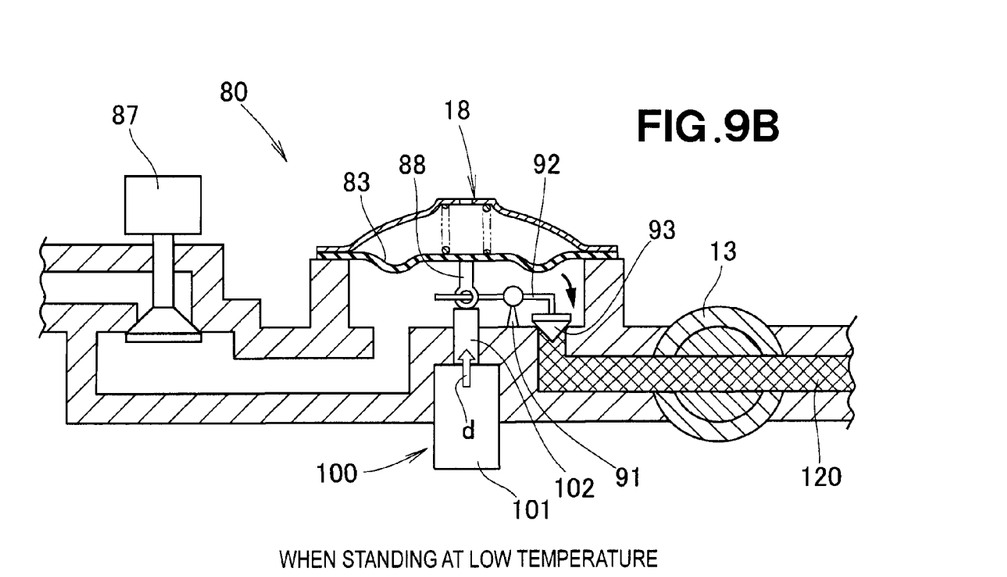

In FIG. 9B, when the gas engine is stopped and left in a state in which the manual stopcock 13 is open, the outside air temperature decreases at night or another time, and the ambient temperature of the temperature-detecting operating device 100 falls below the set temperature, for example, the actuating rod 102 protrudes from the operating device main body 101 as indicated by the arrow from the state shown in FIG. 9A, comes in contact with the distal end of the diaphragm rod 88, and moves the diaphragm rod 88 and the diaphragm 83 upward in the drawing.

As a result, the diaphragm lever 92 swings about the support point 91, and the vacuum modulator 93 is fixed in a closed state. Consequently, the liquefied gas fuel 120 that has flowed out from the small-sized gas tank is blocked by the vacuum modulator 93, and does not flow into the primary regulator 18 or downstream from the primary regulator 18.

In the fuel feeding device 80 according to the third embodiment as described using FIGS. 6 and 7, the liquefied gas fuel fed from the small-sized gas tank 12 as the fuel feeding source is vaporized by the vaporizer 16, this gas fuel is depressurized by the primary regulator 18, and further depressurized to a pressure near atmospheric pressure by the secondary regulator 21, whereby the gas fuel is mixed with air in the mixer 22 and fed to the gas engine 14.

The diaphragm lever 92 is provided integrally with the vacuum modulator 93 for opening and closing the entrance 18a of the fuel passage inside the primary regulator 18. The temperature-detecting operating device 100 has the actuating rod 102 for detecting the ambient temperature at the primary regulator 18 and actuating the diaphragm lever 92.

Consequently, through the use of the temperature-detecting operating device 100, the vacuum modulator 93 of the primary regulator 18 can be fixed in a closed state before the ambient temperature decreases to the temperature at which the liquefied gas fuel liquefies, and the liquid fuel can be prevented from penetrating into the primary regulator 18 when the gas engine is stopped. Consequently, the ability of the gas engine to start 14 can be enhanced.

In the third embodiment, the first compression coil spring 111 made of a shape-memory alloy described above was used as the operational medium for detecting the temperature and causing the actuating rod 102 to protrude, as shown in FIGS. 8A and 8B, but this configuration is not limiting, and a wax or bimetal may also be used. Furthermore, a solenoid valve that operates by receiving a signal from a temperature sensor may also be used in a gas engine in which an electric device can be used.

The temperature-detecting operating device 100 was also configured so that the temperature is detected, and the actuating rod 102 projects and retracts with respect to the operating device main body 101, but this configuration is not limiting, and another operational configuration may be adopted in which a rotation occurs upon detection of the temperature.

Furthermore, a configuration was adopted in which the diaphragm lever 92 is swung by the diaphragm rod 88 being pushed by the actuating rod 102, and the vacuum modulator 93 is fixed in the closed state, as shown in FIG. 7, but this configuration is not limiting, and the vacuum modulator 93 may also be fixed in a closed state by the actuating rod 102 pushing one end of the diaphragm lever 92. Any other method may be used insofar as the vacuum modulator 93 can be fixed in a closed state.

Obviously, various minor changes and modifications of the present invention are possible in light of the above teaching. It is therefore to be understood that within the scope of the appended claims the invention may be practiced otherwise than as specifically described.

What is claimed is:

1. A gas engine fuel feeding device, comprising:
a fuel feeding source;
a vaporizer for vaporizing fuel fed from the fuel feeding source;
a primary regulator for reducing a pressure of the gas fuel;
a secondary regulator for reducing the gas fuel pressure, having been reduced by the primary regulator, further to a pressure near atmospheric pressure;
a mixer for mixing the secondary pressure-reduced gas fuel with air; and
a cutoff valve for blocking flow of fuel when the gas engine is stopped, the cutoff valve being provided to a fuel feeding passage through which the fuel vaporized by the vaporizer is fed to a gas engine,
wherein the cutoff valve is provided upstream in a flow of fuel with respect to the primary regulator,
wherein the cutoff valve is provided downstream in the flow of fuel with respect to the vaporizer, and
wherein the cutoff valve comprises a temperature-sensing valve for sensing the ambient temperature and closing when the ambient temperature is lower than a set temperature.

* * * * *